US009285119B2

(12) United States Patent
Bettinzoli

(10) Patent No.: US 9,285,119 B2
(45) Date of Patent: Mar. 15, 2016

(54) ELECTRICAL CONNECTION FOR CONNECTING A THERMOCOUPLE TO THE MAGNET ASSEMBLY OF A SAFETY COCK FOR GAS SUPPLY

(75) Inventor: Angelo Bettinzoli, Concesio (IT)

(73) Assignee: SABAF S.P.A., Ospitaletto (BS) (IT)

( * ) Notice: Subject to any disclaimer, the term of this patent is extended or adjusted under 35 U.S.C. 154(b) by 316 days.

(21) Appl. No.: 13/806,708

(22) PCT Filed: Jun. 30, 2010

(86) PCT No.: PCT/IT2010/000292
§ 371 (c)(1), (2), (4) Date: Mar. 5, 2013

(87) PCT Pub. No.: WO2012/001716
PCT Pub. Date: Jan. 5, 2012

(65) Prior Publication Data
US 2013/0217245 A1 Aug. 22, 2013

(51) Int. Cl.
*G01K 1/14* (2006.01)
*H01R 11/30* (2006.01)
(Continued)

(52) U.S. Cl.
CPC ................ *F23N 5/105* (2013.01); *F23N 5/107* (2013.01); *H01R 13/052* (2013.01); *F23N 2900/05004* (2013.01); *F23N 2900/05101* (2013.01)

(58) Field of Classification Search
CPC .... F23N 2900/05101; F23N 5/10; G01K 1/14
USPC .................... 374/141, 208, 179, 163; 439/39; 136/200
See application file for complete search history.

(56) References Cited

U.S. PATENT DOCUMENTS 2,271,507 A * 1/1942 Mantz ..................... F23N 5/107 174/47
3,286,216 A * 11/1966 Jackson ................... H01R 9/00 29/863
(Continued)

FOREIGN PATENT DOCUMENTS

EP 0619460 B1 6/1997
ES 1030940 U 11/1995
(Continued)

OTHER PUBLICATIONS

International Search Report published in the corresponding International Application (PCT/IT2010/000292).
(Continued)

*Primary Examiner* — Gail Kaplan Verbitsky
(74) *Attorney, Agent, or Firm* — Lucas & Mercanti, LLP

(57) ABSTRACT

Electrical connection for connecting a phase conductor and ground cable of a thermocouple to the magnet assembly of a gas supply safety cock, including a thermocouple connection head that can be coupled to a complementary contact portion of the magnet assembly, in which the connection head of the thermocouple has a first terminal for the phase conductor, or for the ground cable, and a second terminal for the ground cable, or for the phase conductor, and in which the aforesaid contact portion of the magnet assembly has a complementary jack for the first terminal and a coupling collar for the second terminal. The second terminal advantageously has at least one thin elastic plate internally insertable in the collar, and the thermocouple's connection head and the contact portion of the magnet assembly are shaped to deform the thin elastic plate when inserted inside the same collar in contact with the latter.

9 Claims, 3 Drawing Sheets

(51) Int. Cl.

| | |
|---|---|
| ***H01R 13/60*** | (2006.01) |
| ***F23N 5/10*** | (2006.01) |
| ***H01R 13/05*** | (2006.01) |

(56) References Cited

U.S. PATENT DOCUMENTS

| | | | | | |
|---|---|---|---|---|---|
| 3,426,316 | A * | 2/1969 | Olson | H01R 13/22<br>29/876 |
| 3,597,138 | A * | 8/1971 | Ray | 431/54 |
| 3,810,054 | A * | 5/1974 | Nelson | H01F 7/08<br>137/66 |
| 3,908,898 | A * | 9/1975 | Dykzeul | F23N 5/245<br>236/102 |
| 4,437,726 | A | 3/1984 | Lambert | |
| 4,820,207 | A | 4/1989 | Zic | |
| 6,702,458 | B2 * | 3/2004 | Sirand | 374/208 |
| 8,039,729 | B2 * | 10/2011 | Nguyen | 136/230 |
| 2005/0221244 | A1 * | 10/2005 | Nguyen | F23N 5/107<br>431/80 |

FOREIGN PATENT DOCUMENTS

| | | | | |
|---|---|---|---|---|
| FR | 1406969 | A | 6/1965 | |
| GB | 000590605 | A * | 7/1947 | |
| GB | 000726189 | A * | 3/1955 | |
| GB | 2152298 | A | 7/1985 | |
| IT | 2349839 | C2 * | 3/2009 | H01R 24/38 |
| WO | 2007/019885 | A1 | 2/2007 | |
| WO | 2009106581 | A2 | 9/2009 | |

OTHER PUBLICATIONS

Communication pursuant to Article 94(3) EPC issued Nov. 30, 2015 (5 pages).

* cited by examiner

ELECTRICAL CONNECTION FOR CONNECTING A THERMOCOUPLE TO THE MAGNET ASSEMBLY OF A SAFETY COCK FOR GAS SUPPLY

FIELD OF INVENTION

The present invention concerns a connection for the electrical connection of a bipolar thermocouple to a magnet assembly of a safety solenoid valve of a gas supply cock for a burner, preferably a domestic one.

KNOWN PRIOR ART

In the known art, gas burners, in particular domestic ones, are fed through supply cocks having a safety solenoid valve that, functionally connected to a thermocouple placed close to the burner's flame ring, is able to interrupt the flow of gas if there is no flame at the burner in question.

More in particular, the safety solenoid valve usually comprises an obturator for the flow of gas going to the burner, which is held in a flow cutoff position thanks to a spring and can be moved, in opposition to the spring, to a flow enabling position by a kinematic mechanism operated either manually or by the action of an electromagnet, excited by the electric current (emf) produced by the above-mentioned thermocouple when the latter is subjected to the heat of the flame. When there is no flame, there is no electric excitation current for the magnet and the obturator is therefore pushed to its flow cutoff position by the above-mentioned spring.

The electromagnet, which is positioned in a portion, integral or otherwise, of the gas supply cock defined as the "magnet assembly", must therefore be electrically connected to the thermocouple, located close to the burner's gas ring, by means of an electrical connection, preferably of the mechanical coupling type.

In particular, the use of thermocouples is known in which two electrical terminals are respectively connected to the electromagnet and to a metal body connected to ground. In this way, the terminals of such a thermocouple are respectively indicated as phase conductor, the one designed to be connected directly to the electromagnet, and ground cable, the one designed to be connected to ground. Normally, the ground cable of the thermocouple is electrically connected to the metal casing that houses the electromagnet in the magnet assembly, while the phase conductor is connected to the electromagnet by means of a coaxial jack, of the unipolar male-female type.

For example, British patent application GB-A-2399680, in the name of Manuel Valls Vicent, describes an electrical connection of a thermocouple to a magnet assembly of a gas cock, in which the thermocouple's phase conductor terminates in a cylindrical female terminal that is inserted onto a male terminal of the magnet assembly, directly connected to the coil of an electromagnet.

In particular, this female terminal is housed in a tubular connection head, made of an insulating material, which is shaped so as to couple, by coaxial connection, inside a complementary metal coupling collar of the magnet assembly, within which the aforesaid male terminal is situated.

The thermocouple's ground cable, instead, is separate from the aforesaid thermocouple connection head and terminates in an elastic terminal clamp designed to engage with the same collar of the magnet assembly.

This solution, although undoubtedly simple to make, has the disadvantage of becoming awkward during assembly of the burner. In fact, the need to perform a mechanical coaxial coupling followed by an elastic radial connection of the thermocouple's two terminals on the aforesaid collar of the magnet assembly, conflicts with the space, usually very small and irregular, existing between cock, hob, burner and associated hob framework, giving the operator limited space for manoeuvre.

To resolve this drawback, European patent EP-A-0619460, in the name of Orkli, proposes integrating both the phase conductor and the ground cable in the same thermocouple connection head, this connection head being shaped so that it can be coupled coaxially, in a single operation, to the aforesaid coupling collar of the magnet assembly.

More in detail, the Orkli patent indicates how to make an electrical connection for connecting the conductors of a thermocouple to the magnet assembly of a gas supply cock, in which the female terminal of the thermocouple's phase conductor is partially surrounded by a sleeve made of an insulating material that, in turn, is partially surrounded by a conductive sheath connected to the ground cable and in which the female terminal, insulating sleeve and conductive sheath form a removable connection head for the aforesaid collar of the magnet assembly. This connection head is shaped as to allow the simultaneous engagement of the conductive sheath on the outer wall of the coupling collar and of the female terminal on the associated male terminal inside this collar.

The Orkli solution resolves the assembly problems of patent application GB-A-2399680, but does not prevent a certain amount of difficulty in coupling the thermocouple's contact body onto the collar of the magnet assembly, due both to the fact that the connection head provides a simultaneous internal and external coupling on the collar of the magnet assembly and the fact that this geometry necessarily imposes close tolerances between the coupling components.

Spanish utility model ES-U-1030940, in the name of Manuel Valls Vicent, describes an electrical connection of a thermocouple and a associated magnet assembly of a gas supply cock, similar to that described in EP-A-0619460, in which the collar of the magnet assembly is externally housed in an insulated housing and is undulated so as to achieve keyed coupling with the conductive sheath of the thermocouple's ground cable, this also appropriately undulated.

The solution described in ES-U-1030940, although preventing the electrical connection from accidentally coming undone, does not solve the problem of the difficulty in coupling the thermocouple's connection head with the contact portion of the magnet assembly.

One object of the present invention is to make an electrical connection between a thermocouple, of the type fitted with a phase conductor and a ground cable, and a magnet assembly of a gas supply safety cock that does not have the drawbacks of the above known prior art.

Another object of the present invention is to make an electrical connection of the above-indicated type that is simple to assemble and that, at the same time, prevents the electromechanical coupling from accidentally coming undone.

A further object of the present invention is to make an electrical connection between the thermocouple and magnet assembly of a gas supply safety cock that protects the electrical contacts and prevents the accidental entry of dirt inside the magnet assembly.

SUMMARY OF THE INVENTION

These and other objects are achieved by the electrical connection for connecting the phase conductor and ground cable of a thermocouple to the magnet assembly of a gas supply safety cock as claimed in the first independent claim and in the successive dependent claims.

According to the present invention, the electrical connection for connecting the phase conductor and the ground cable of a thermocouple to the magnet assembly of a gas supply safety cock comprises a thermocouple connection head that can be coupled with a complementary contact portion of the magnet assembly, in which this thermocouple connection head comprises a first terminal for the phase conductor and a second terminal for the ground cable, or vice versa, and in which said contact portion of the magnet assembly comprises a complementary jack for the first (phase) terminal and a metal coupling collar for the second (ground) terminal. To advantage, the second (ground) terminal comprises at least one thin elastic plate insertable inside the collar, and the thermocouple connection head and contact portion of the magnet assembly are also shaped to deform this thin elastic plate when inserted in the coupling collar, so that the thin elastic plate enters and remains in contact with the inner surface of the aforesaid collar.

In this way, as a person skilled in the art can appreciate, on the one hand, how the insertion of the entire thermocouple connection head inside the coupling collar of the magnet assembly simplifies the operation of connecting these components and, on the other, how the elastic deformation that the thin plate undergoes when coupled inside the collar, and therefore the related elastic return force exerted by the thin plate on the corresponding inner wall of the same collar, contributes to preventing accidental disengagement of the same connection head from the associated contact portion of the magnet assembly, especially during the heat cycles to which the electrical connection is subjected.

In addition, the elasticity of the thin plate, or thin plates, facilitates insertion of the thermocouple connection head inside the coupling collar of the magnet assembly and makes it possible to use less stringent tolerances for these components.

Lastly, the fact that the connection's electrical contacts according to the present invention are made inside the magnet assembly, within the so-called coupling collar, protects these electrical contacts from dirt and accidental tampering.

According to a preferred aspect of the present invention, the aforesaid first terminal is a female terminal that connects over a male pin, forming the aforesaid complementary jack.

Furthermore, according to another preferred aspect of the present invention, the coupling collar surrounds the aforesaid complementary jack and is electrically separated from the latter by an electrically insulating sheath.

This configuration further simplifies the coupling between the thermocouple connection head and the contact portion of the magnet assembly.

According to a further preferred aspect of the present invention, the thermocouple connection head is equipped with an outer shell made of an insulating material that substantially houses the terminals of the phase conductor and the ground cable, and the contact portion of the magnet assembly comprises a shaped end for mechanical coupling, preferably keyed coupling, with the aforesaid outer support of the connection head.

This solution renders the mechanical coupling between connection head and contact portion of the magnet assembly more stable, protects the electrical contacts and prevents, or impedes, the entrance of dirt inside the collar of the magnet assembly.

BRIEF DESCRIPTION OF FIGURES

A preferred embodiment of the present invention shall now be described, purely by way of non-limitative example, with reference to the enclosed figures, where.

DETAILED DESCRIPTION OF SOME PREFERRED EMBODIMENTS OF THE PRESENT INVENTION

Figure 1:
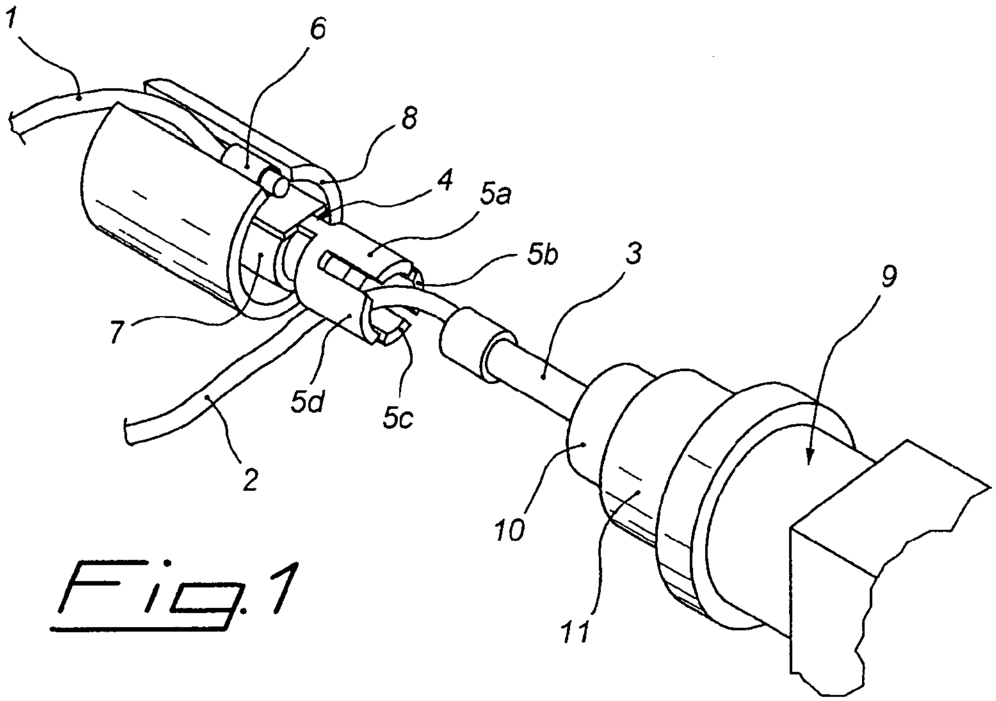
FIG. 1 is a schematic perspective view of an electrical connection between the thermocouple and the magnet assembly of a gas supply safety cock, according to a preferred aspect of the present invention, in which the various components are not assembled together.

With general reference to the enclosed figures, the electrical connection for the coupling of a thermocouple to a magnet assembly 9, or rather the associated electromagnet of a gas supply safety cock, or valve, according to a preferred aspect of the present invention, comprises a connection head 100 for the phase 2 and ground 1 conductors coming from a bipolar thermocouple (not shown) and a complementary contact portion 200 of the magnet assembly 9, provided to enable the grounding of the thermocouple's conductor 1 and to connect the phase conductor 2 to the coils of an electromagnet 12 (symbolically represented in the figures), located inside the aforesaid magnet assembly 9.

In particular, the thermocouple's connection head 100 comprises a first female terminal 3, for the phase conductor 2, which has a tubular metal body of circular cross-section with one end open for connection to a complementary male jack 13, connected to the electromagnet 12, and at least one terminal clamp 14, or equivalent structure, for securing the phase conductor 2 to this terminal 3.

The terminal 3 is mounted inside a cylindrical sheath 7 made of an electrically insulating material, which also functions as a support for the second terminal 4, connected to the ground cable 1 coming from the thermocouple.

The second terminal 4, electrically separated from the terminal 3 thanks precisely to the insulating sheath 7, is connected to the ground cable 1 via a terminal clamp 6, or equivalent structure, and has a cylindrical shape complementary to that of a coupling collar 10 with which the magnet assembly 9 is equipped.

Lastly, the thermocouple's connection head 100 comprises an outer shell 8, made of an electrically insulating material, having a cylindrical shape of circular cross-section, with an axial split to facilitate assembly of the above-listed components.

Figure 2:
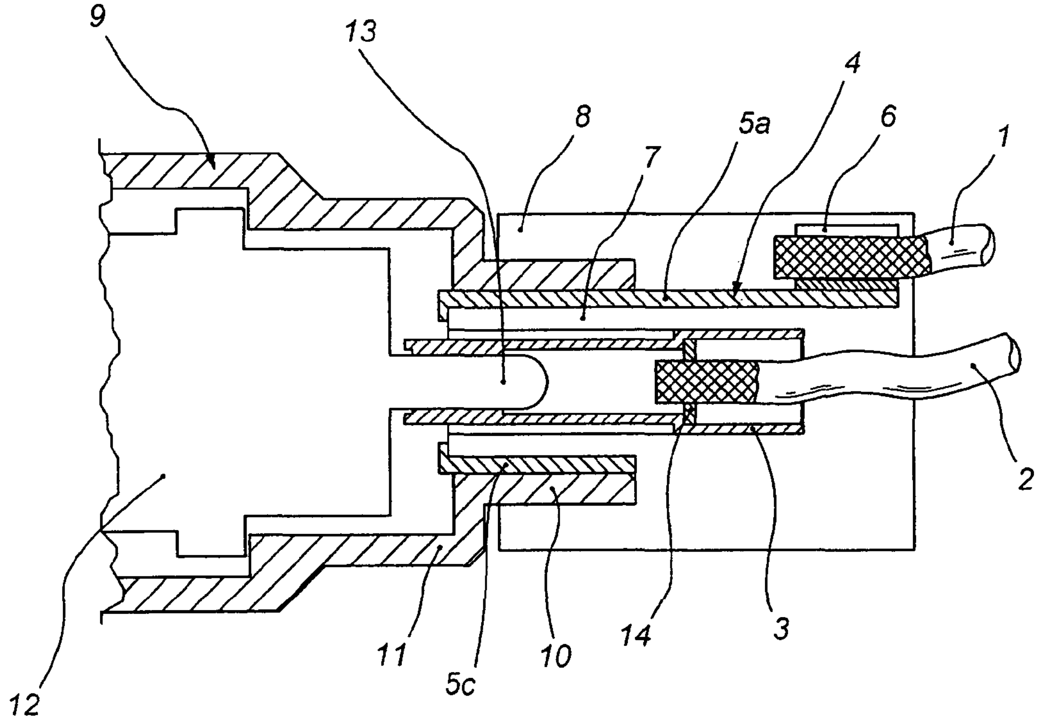
FIG. 2 is a schematic, cross-sectional side view of the electrical connection in FIG. 1, in which the components are assembled together.
Figure 3:
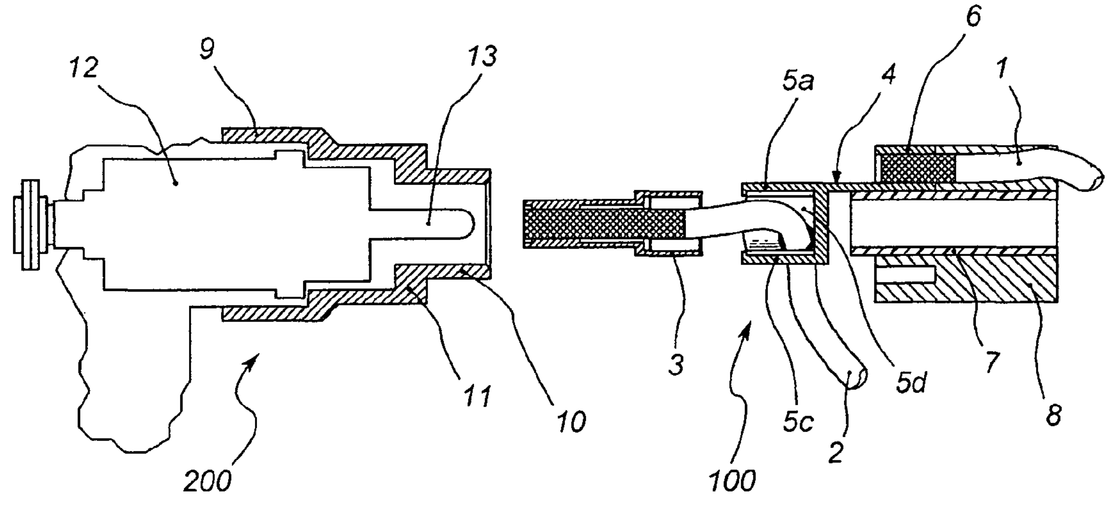
FIG. 3 is a schematic, cross-sectional side view of the electrical connection in the previous figures, with the components not assembled.

It should be noted that, as shown in the example in FIG. 2 or 3, the cylindrical sheath 7 is obtained as a single piece with the outer shell 8 and forms an internal protrusion that extends outside the latter.

In this way, the ground terminal 4, which longitudinally juts out above the cylindrical sheath 7, is always electrically insulated from the female phase terminal 3 housed in this sheath 7.

In the particular embodiment of the electrical connection according to the present invention shown herein, the contact portion 200 of the magnet assembly 9, as touched upon above, comprises a metal collar 10 of cylindrical shape, provided to couple with the aforesaid second terminal 4 of the head 100. This collar 10 is shaped to enable the grounding of the ground cable 1 and surrounds a male jack 13, connected to the electromagnet 12 and designed to be inserted into the female terminal 3 of the phase conductor 2 of the thermocouple's connection head 100.

In particular, the jack 13, also made of a conductive material, is surrounded at a certain reciprocal distance by the collar 10, such that the cylindrical space between these components permits the insertion of the terminals 3 and 4 of the head 100 and therefore the electrical connection between the conductors 1 and 2 and, respectively, the metal body of the magnet assembly 9 (in turn opportunely connected to ground) and the electromagnet 12.

Furthermore, the collar 10, in turn, finishes at the opposite end to that of the entrance of the connection head 100, in a cylindrical moulding 11, also made of metal, which facilitates the anchorage of the magnet assembly 9 and can, if necessary, act as a stop for the aforesaid shell 8, made of an insulating material, of the thermocouple's connection head 100.

Figure 4:
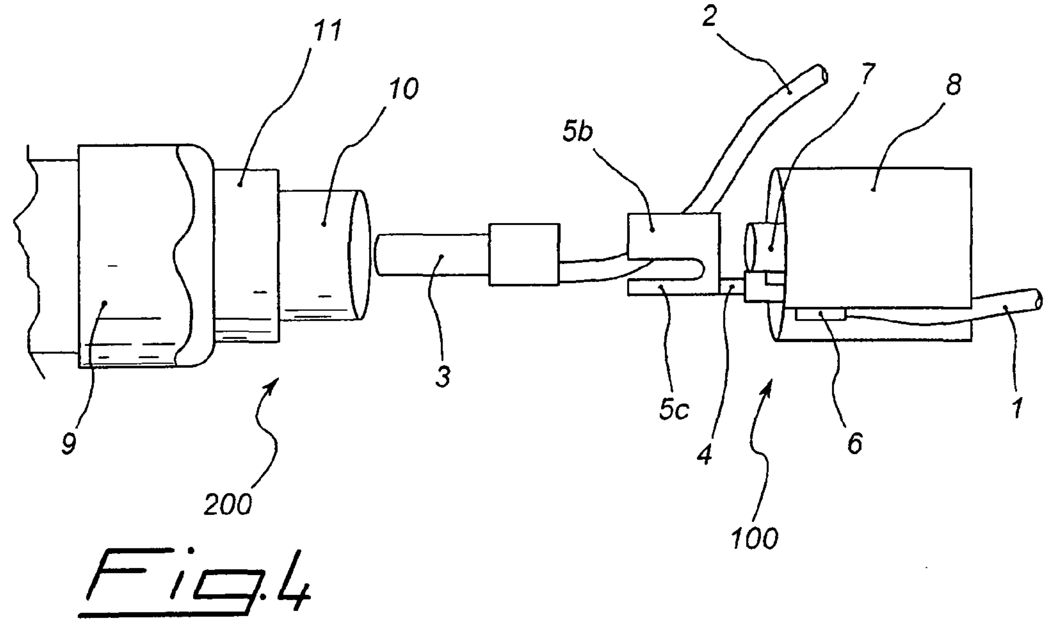
FIG. 4 is a side view in profile of the electrical connection in the previous figures with the components unassembled.

More in detail, as can be seen in FIGS. 3 and 4 for example, the collar 10 projects from the moulding 11 for a sufficient length to enable connection of the terminals 3 and 4 of the connection head 100 inside the same collar 10 and, if necessary, to provide a stop for the base portion of the cylindrical shell 8, which during connection becomes positioned above the collar 10, against the aforesaid moulding 11.

It should be noted that, even though a thermocouple connection head 100 and a corresponding contact portion 200 of the magnet assembly 9 having substantially cylindrical symmetry and coaxial extension of the electrical terminals have been described up till now, any other shape for these components falls within the scope of protection applied for herein. Furthermore, as will be obvious to a person skilled in the art, even if an outer terminal 4 connected to the ground cable 1 of the thermocouple and an inner coaxial terminal 3 connected to the phase conductor 2 of the thermocouple are described, any other arrangement and configuration of the terminals and conductors falls within the scope protection defined by the following claims.

According to a preferred aspect of the present invention, the terminal 4 advantageously comprises four thin metal plates 5*a*, 5*b*, 5*c* and 5*d*, elastically deformable and set apart from each other, provided for being internally inserted in the aforesaid coupling collar 10, such that they become deformed and make contact with the inner walls of the latter by such insertion.

More in detail, the shape of the thin elastic plates 5*a*-5*d* and the dimensions of the collar 10 are such that upon insertion of the thermocouple's connection head 100 into the metal collar 10 of the contact portion 200 of the magnet assembly 9, these thin plates 5*a*-5*d* are deformed so that they are pushed, by their own elastic return, into contact with the inner walls of the collar 10.

As already deduced, the fact that the thin elastic plates 5*a*-5*d* are inserted inside the collar 10 and that they are deformed by this insertion such that they remain in contact with the inner surfaces of the same collar 10, allows both to guarantee a stable electrical connection and easy coupling of the thermocouple's connection head 100 with the contact portion 200 of the magnet assembly 9, given that the elasticity of the thin plates 5*a*-5*d* renders very close tolerances between the various components unnecessary, and to protect the electrical contacts that are inside the magnet assembly 9 and the shell 8 from dirt or involuntary tampering.

As the person skilled in the art will appreciate, even if a cylindrical terminal 4 fitted with a number of thin elastic plates 5*a*-5*d* is described herein, any other type of electrical terminal fitted with at least one thin elastic plate shaped to deform itself on contact—that is to deform itself so as to be pushed by its own elastic return into contact—with the inner walls of the collar 10 following insertion into the same collar 10, falls within the scope of protection applied for herein.

Figure 5:
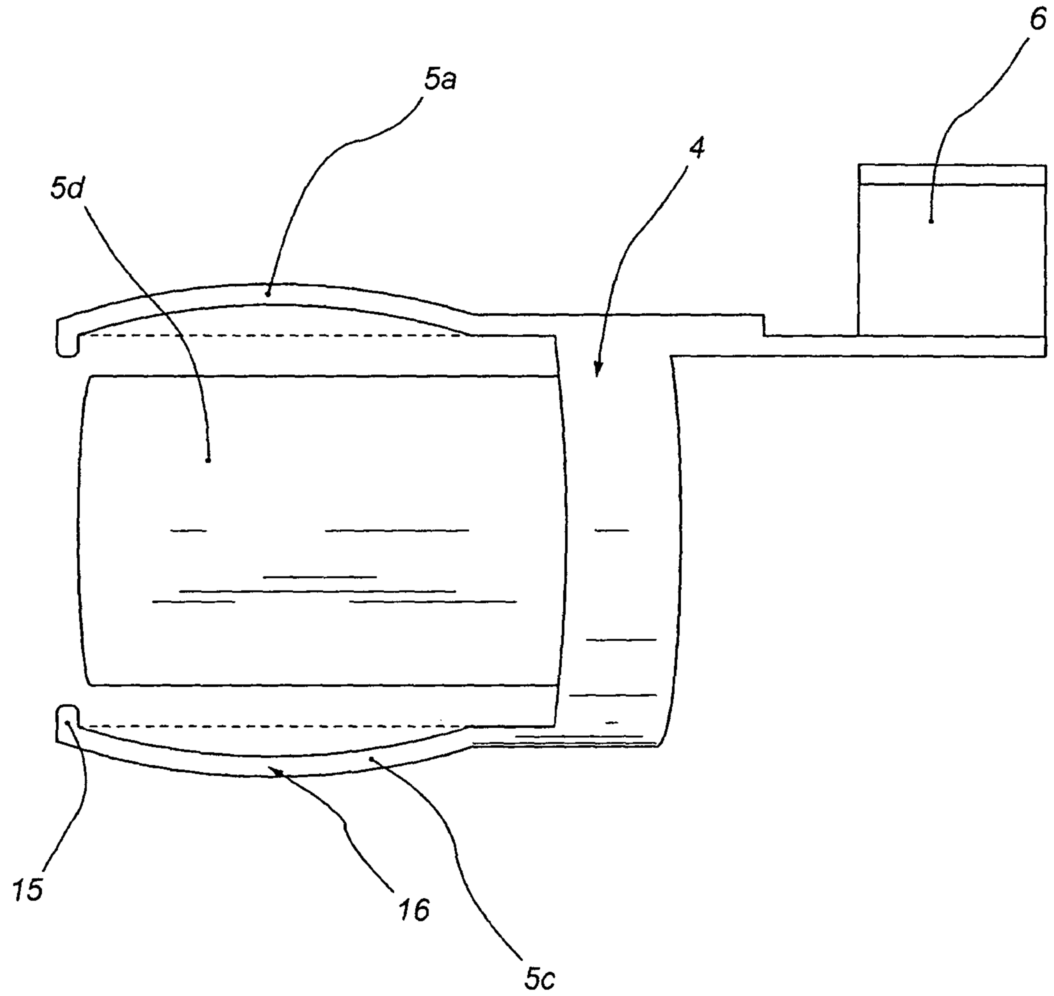
FIG. 5 is an enlarged profile view of the outer terminal of the thermocouple connection head of the electrical connection in the previous figures.

According to a particular aspect of the present invention and with reference to FIG. 5 in particular, the terminal 4 for the ground cable of the thermocouple can have a "barrel" configuration, i.e. be comprised of a set of thin metal plates 5*a*-5*d* that, spaced apart from each other, each have an outwardly arched portion, capable of being deformed during insertion inside the collar 10.

More in detail, each thin plate 5*a*, 5*b*, 5*c* and 5*d* can include an end portion 15, positioned at the front and, if necessary, bent to engage with the aforesaid insulating sheath 7, which is preceded by an outwardly concave, or arched, portion 16 that is designed to be elastically deformed by contact with the inner walls of the collar 10 of the contact portion 200 of the magnet assembly 9. In this way, each thin plate 5*a*-5*d* becomes substantially straight whilst coupled with the collar, 10 and contact between each thin plate 5*a*-5*d* and the inner walls of the collar 10 is guaranteed by the elastic return force of each thin plate 5*a*-5*d* towards it arched rest position, a force that pushes each thin plate 5*a*-5*d* against the collar 10.

According to a particular aspect of the present invention, the assembly of the above-described electrical connection takes place by first making and separately assembling the thermocouple's connection head 100 and the magnet assembly 9 fitted with the aforesaid contact portion 200, and then connecting the connection head 100 with this contact portion 200.

The assembly of the thermocouple's connection head 100 first provides for clamping the ground 1 and phase 2 conductors coming from the thermocouple to the respective terminals 4 and 3 by means of the associated terminal clamps 6 and 14, and then the insertion of the terminals 4 and 3 respectively into the outer housing 8 and inside the insulating sheath 7.

More in detail, the phase terminal 3, constituted in this case by a cylindrical female jack, is inserted in the insulating sheath 7 and the ground terminal 4, fitted with the thin elastic plates 5*a*, 5*b*, 5*c* and 5*d*, is mounted above this insulating sheath 7, inside the housing 8. In this regard, the two terminals 3 and 4 can be inserted in the respective insulating housings by interference fitting, or by keyed couplings, so as to impede subsequent undesired disassembly of these components.

Assembled in this manner, the thermocouple's connection head 100 is then coaxially inserted into the collar 10 of the contact portion 200 of the magnet assembly 9 so that both the terminals 3 and 4 and the associated insulating sheath 7 are inserted inside the collar 10, while the insulating shell 8 is outside of this collar 10.

The insertion of the head 100 inside the contact portion 200 allows the female terminal 3 of the phase conductor 2 to fit onto the male jack 13 inside the collar 10 of the magnet assembly 9, in this way creating the phase contact with the electromagnet 12 and, at the same time, making the thin elastic plates 5*a*-5*d* of the terminal 4 of the ground cable 1 deform and, thanks to their elastic return, have them push against the inner wall of the collar 10 and so create the ground contact between the thermocouple's connection head 100 and the contact portion 200 of the magnet assembly 9.

The mechanical coupling between the thermocouple's connection head 100 and the contact portion 200 of the magnet assembly 9 comes to a halt thanks the end of the collar 10 hitting against a corresponding inner wall of the outer shell 8, as can be seen in FIG. 2, or alternatively, in an embodiment not shown here, thanks to the outer shell 8 of the same connection head 100 butting against the moulding 11 of this contact portion 200, a moulding 11 that, as said, can act as a end stop for this connection head 100.

In this way, as has already been seen, the mechanical coupling of the thermocouple's connection head 100 inside the collar 10 is facilitated, also thanks to the fact that close constructional tolerances are not necessary, the electrical connection of the thermocouple to the magnet assembly 9 being stable and the electrical contacts being protected from dirt or tampering as they are inside the magnet assembly 9.

The invention claimed is:

1. Electrical connection for connecting the phase conductor and the ground cable of a thermocouple to the magnet assembly of a gas supply safety cock, comprising a thermocouple connection head that can be coupled to a complementary contact portion of the magnet assembly, in which said thermocouple connection head comprises a first terminal for said phase conductor, or for said ground cable, and a second terminal for said ground cable, or for said phase conductor, and in which said contact portion of the magnet assembly comprises a complementary jack for said first terminal and a coupling collar for said second terminal, wherein said second terminal comprises at least one thin elastic plate insertable inside said collar, said thermocouple connection head and said contact portion of the magnet assembly being shaped to deform said at least one thin elastic plate, when inserted inside and in contact with said collar, said at least one thin elastic plate being shaped to remain in contact in a substantially straight configuration with the inner walls of said collar when said thermocouple connection head is coupled to said contact portion of the magnet assembly, wherein said contact between said at least one thin elastic plate and the inner walls of said collar allows both electrical connection and mechanical coupling between said thermocouple connection head and said contact portion of the magnet assembly, wherein said at least one thin elastic plate comprises a free end and a fixed end fixed to said second terminal, and an outwardly arched portion between said fixed end and said free end that is outwardly arched when said thermocouple connection head is not coupled to said contact portion of the magnet assembly and elastically deformed to form the substantially straight configuration with the inner walls of said collar when said thermocouple connection head is coupled to said contact portion of the magnet assembly.

2. Electrical connection according to claim 1, wherein said first terminal is a female terminal and that said complementary jack is a male jack insertable inside said female terminal.

3. Electrical connection according to claim 1, wherein said collar surrounds said complementary jack and is separated from the latter, and in that said at least one thin elastic plate outwardly extends to said first terminal and is separated from the latter by an electrically insulating sheath.

4. Electrical connection according to claim 1, wherein said second terminal comprises two or more thin elastic plates, spaced apart from each other.

5. Electrical connection according to claim 4, wherein said two or more thin elastic plates surround said first terminal.

6. Electrical connection according to claim 1, wherein thermocouple connection head comprises an outer shell made of an insulating material.

7. Electrical connection according to claim 6, wherein said contact portion of the magnet assembly comprises a shaped end for mechanical coupling with said outer shell of said thermocouple connection head.

8. Electrical connection according to claim 1, wherein said thermocouple connection head and said contact portion of the magnet assembly are substantially cylindrical.

9. Electrical connection according to claim 1, wherein said thermocouple connection head and said contact portion of the magnet assembly are coaxially connectable.

* * * * *